United States Patent
Davies et al.

(10) Patent No.: US 11,745,043 B2
(45) Date of Patent: *Sep. 5, 2023

(54) LOCKING MECHANISM

(71) Applicant: SpeedClips USA, LLC, Henrico, VA (US)

(72) Inventors: David Robert Davies, North Chesterfield, VA (US); Hugh Anderson, Henrico, VA (US); Randy Franks, Henrico, VA (US)

(73) Assignee: SpeedClips USA, LLC, Henrico, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,810

(22) Filed: Aug. 5, 2021

(65) Prior Publication Data
US 2021/0361996 A1    Nov. 25, 2021

Related U.S. Application Data

(63) Continuation of application No. 17/088,127, filed on Nov. 3, 2020, now Pat. No. 11,117,013.

(60) Provisional application No. 62/989,433, filed on Mar. 13, 2020.

(51) Int. Cl.
*A63B 21/072* (2006.01)
*F16B 2/16* (2006.01)

(52) U.S. Cl.
CPC ........... *A63B 21/0728* (2013.01); *F16B 2/16* (2013.01); *Y10T 403/592* (2015.01)

(58) Field of Classification Search
CPC ............ A63B 21/0724; A63B 21/0726; A63B 21/0728; F16B 7/1454
See application file for complete search history.

(56) References Cited

U.S. PATENT DOCUMENTS

| | | | | |
|---|---|---|---|---|
| 4,893,810 A | * | 1/1990 | Lee .................... | A63B 21/0728 24/115 L |
| 5,141,355 A | * | 8/1992 | Stillwagon ............ | F16B 7/1409 403/322.2 |
| 5,295,934 A | * | 3/1994 | Collins .............. | A63B 21/0728 482/107 |
| 6,007,268 A | * | 12/1999 | Whittington ....... | A63B 21/0728 403/348 |

(Continued)

*Primary Examiner* — Daniel J Wiley
(74) *Attorney, Agent, or Firm* — WC&F IP

(57) ABSTRACT

A lock mechanism which can be placed on a shaft, such as a bar or pole, in either a first direction or second direction, is secured to the shaft using two sets of balls which project out of apertures in an inner cylinder to frictionally engage the shaft. The balls are selectively retractable from their projecting position to allow the inner cylinder to slide on and/or be removed from the shaft. Biasing members, such as wavy springs, bias the two sides of the lock mechanism towards one another. In the locked configuration, the balls are forced by inclined surfaces within the two sides to project outwardly from the inner hollow cylinder. The inclined surfaces are aligned with two rows of apertures in the inner hollow cylinder, and they are inclined in opposite directions. Thus, either way the lock mechanism is installed or placed on the shaft, the balls will project out of the apertures in the inner hollow cylinder and will securely engage the shaft.

12 Claims, 4 Drawing Sheets

(56) References Cited

U.S. PATENT DOCUMENTS

| | | | | |
|---|---|---|---|---|
| 6,059,700 A | * | 5/2000 | Ellenburg | A63B 21/0724 |
| | | | | 482/107 |
| 9,095,743 B2 | * | 8/2015 | Davies, III | A63B 21/0728 |

* cited by examiner

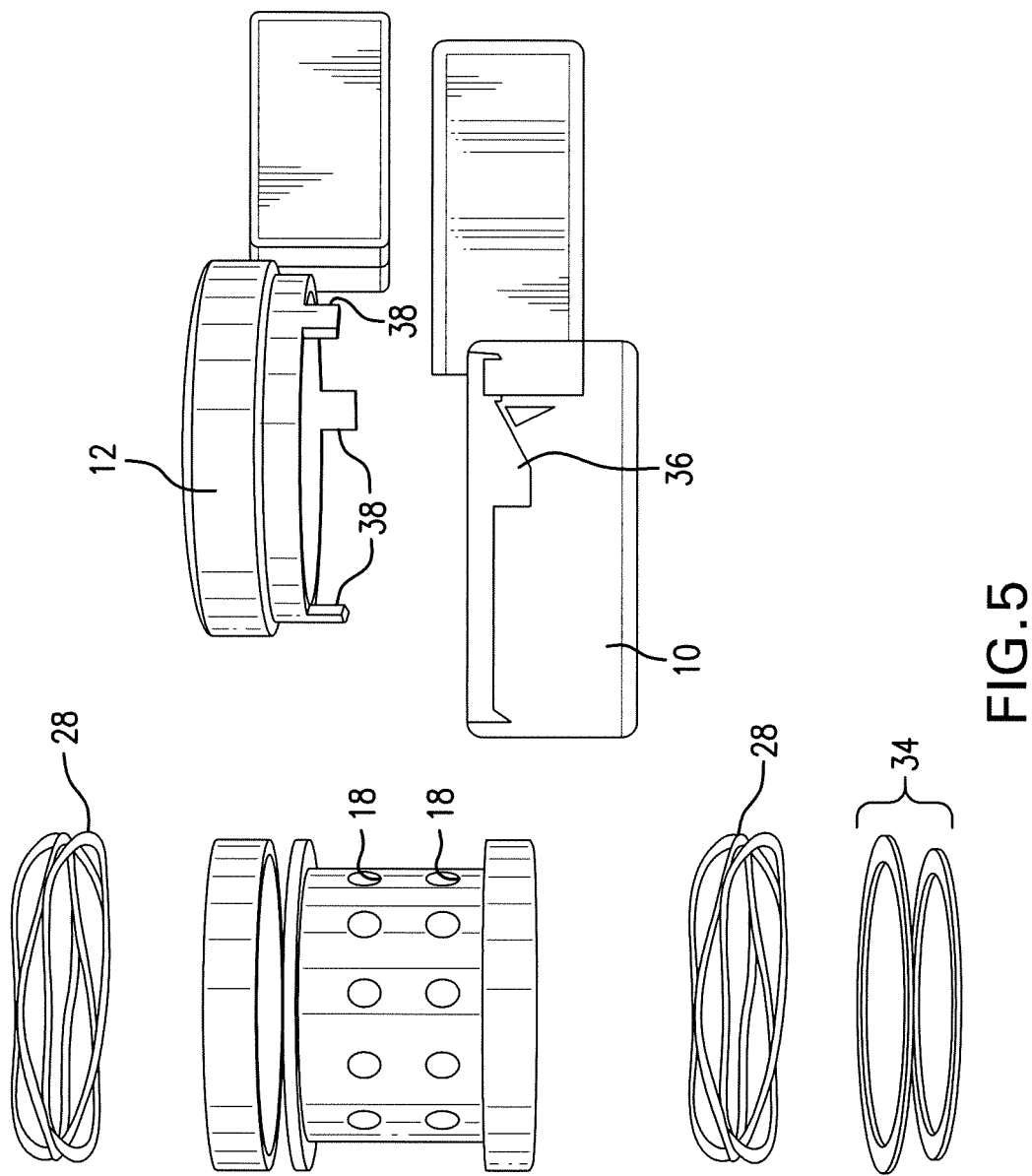

LOCKING MECHANISM

CROSS-REFERENCE TO RELATED APPLICATIONS

This application claims priority to U.S. Ser. No. 62/989,433 filed on Mar. 13, 2020, and the complete contents thereof is herein incorporated by reference.

FIELD OF THE INVENTION

The invention pertains to frictional engagement locking mechanisms, and particularly to hand operated locking mechanisms that lock to a bar or pole, and which are operable when installed in either direction on a bar or pole.

BACKGROUND

Improved frictional fit locking mechanisms are described in U.S. Pat. Nos. 9,925,407, 9,522,296, 9,084,913, and 9,925,407, each of which are herein incorporated by reference. These technologies provide a hand operated locking mechanism engageable with a shaft (e.g. a bar, a pole, etc.), and which are manually operable for removal from the shaft or for sliding to a new location on the shaft. The technologies include a first cylinder which, depending on whether the lock is in a locked or unlocked position, may slide freely on the shaft. One or more holes in the cylinder are designed to retain balls (e.g., steel or plastic) therein. The balls are biased by a spring and tensioning ring combination to project into the cylinder and to frictionally engage the shaft when the locking mechanisms are in the locked position. The technologies provide a number of configurations which allow for easily eliminating the spring bias so that the balls roll down the face of the inclined face of the tension ring and retract from projecting out of the holes in the cylinder, thereby allowing the locking mechanism to slide on the shaft. On release from the unlocked configuration, the spring bias causes the balls to move up the inclined face of the ring and out the opening of the inner cylinder so that they are pressed tightly against the shaft.

SUMMARY

The invention provides a compact locking mechanism that can be put on a shaft in either direction and lock to the shaft.

According to the invention, a two sided lock is configured such that either side 1 or side 2 can function as the top or bottom, so that no matter how the lock is installed on a shaft, the lock will hold tightly to the shaft. The locking mechanism includes a hollow inner cylinder with two rows of apertures spaced slightly apart in its axial direction. Balls, such as ball bearings, are fitted into different apertures in the two sets of ball holes. Preferably, the balls are fitted at every other position within a row. The ball bearings may be steel, brass, ceramic, or plastic. Good results are obtained with brass, metals other than steel, and some toughened plastics which are not quite as hard as steel, as these materials do not grip the shaft so hard as to put small dents in the shaft or bar. Side 1 and side 2 of the locking mechanism are moved axially away from one another to allow the balls to retract at least partially from their projecting positions, and this allows the inner cylinder to slide freely on or be removed from the shaft. Movement of the two sides away from each other can be accomplished conveniently by using handles which include a ramping mechanism, whereby clamping the handles together causes projections on one side member to ride up ramps on the other side member. Biasing members, preferably in the form wavy springs which encircle the inner hollow cylinder, and which sometimes may referred to as tension retainers, cause side 1 and side 2 of the locking mechanism to move back together when the clamping action ceases. Two sets of oppositely angled inclines on the inner surfaces of side 1 and side 2 of the locking mechanism, are aligned with the two rows of apertures in the hollow cylinder. In operation, the balls ride up the inclined surfaces and are caused to project out the apertures due to the bias imparted by the wavy springs. When the bias is relieved, such as by clamping handles together, the balls can be retracted from their projecting positions because they are permitted to ride down the inclined surfaces slightly. In a preferred embodiment, the inclines are integrally formed in the inside surfaces of side 1 and side 2 of the locking mechanism. However, the inclines may, in some situations be in the form of separate radial inclined planes that are affixed to the inside surfaces of side 1 and side 2 of the locking mechanism.

DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 5 is an exploded view of a number of components used in an alternative locking mechanism illustrating examples of circumferentially positioned inclined slots in one side element which interact with projections in the other side element.

DETAILED DESCRIPTION

By example, the locking mechanism will be described in the form of a weight collar lock. However, it should be understood that the locking mechanism may be used in a variety of different applications. For example, it may be integrated into a weight, as is described in U.S. Pat. No. 9,925,407. In addition, it may be used on a pole for lifting and holding an umbrella. It may also be used on a pole used for stretching exercises where the locking mechanism is slid to the desired location and the pole, then locked in place to allow stretching using the pole. It may be used to hold a silencer to a gun barrel. It may be used to hold tight rigging used in aircraft, trucks, and the like. The locking mechanism may be used in rigging, scaffolding, and other support structures. The locking mechanism may be used in just about any application where a convenient locking mechanism will allow a secure frictional fit against a shaft. Experiments have shown that configurations of the locking mechanism as described herein can withstand hundreds of pounds of force, despite its compact and simplified design.

Figure 1:
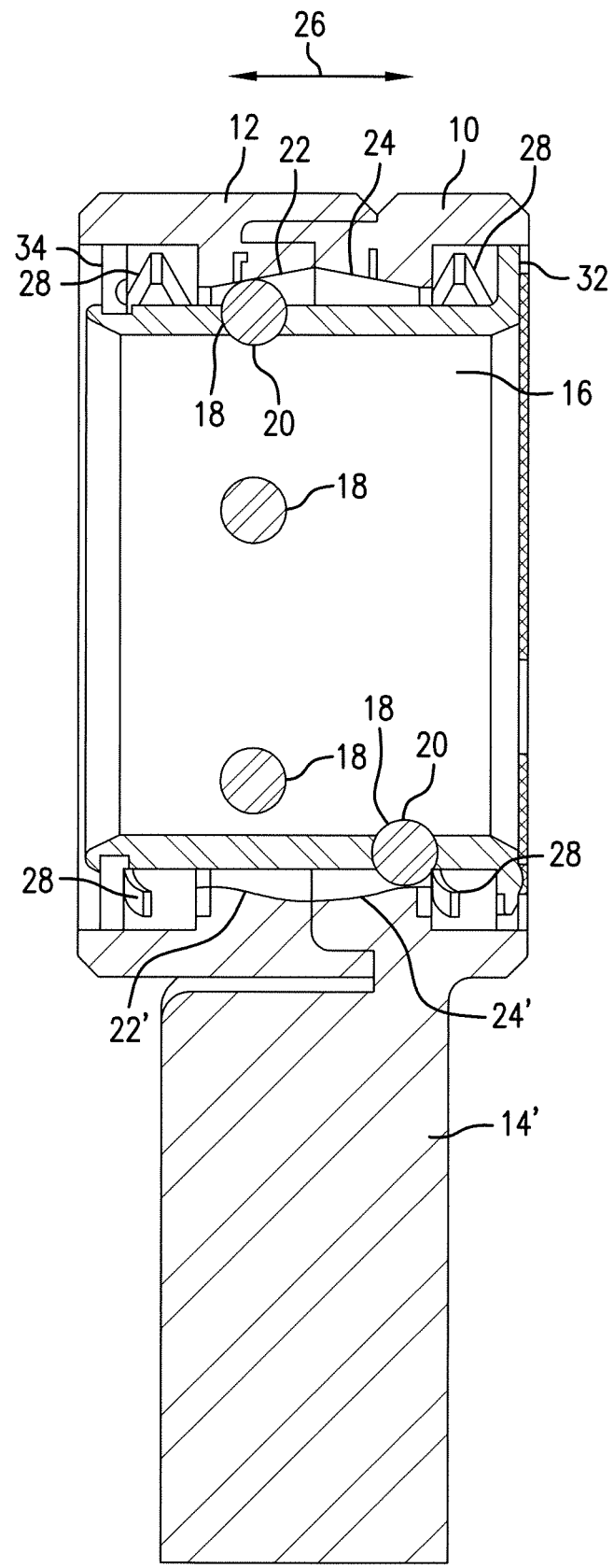
FIG. 1 is a cut-away view the locking mechanism illustrating all of the components including integral inclined surfaces on the first and second sides of the locking member.

With reference to FIG. 1, the locking mechanism has a first side 10 and a second side 12. FIG. 1 shows that the second side 12 is integrally formed with a handle 14'. As we will be seen in FIG. 2, the first side is also integrally formed with handle 14. However, it should be understood that the locking mechanism need not have handles for some applications (e.g., a tab or knurled outer edge may be appropriate, for example, with stretching pole or umbrella, and other configurations are possible), and the handles 14 and 14' need not be integrally formed with the first side 10 and second side 12.

Each of the sides 10 and 12 encircle an inner hollow cylinder 16. The inner hollow cylinder has two spaced apart rows of apertures 18. The apertures 18 are sized to allow balls 20, such as ball bearings, to project out of the apertures 18, but not to pass through the apertures 18. The balls 20 can be metal, plastic, or ceramic. Good results are obtained with brass or metals (including metal alloys) which are softer than steel, as steel balls 20 have been found to leave small divots in the shafts to which the locking mechanism is attached, due to the hardness of steel. In addition, toughened plastics can provide good results when they are used as the balls 20. FIG. 1 shows the locking mechanism in the locked position where the balls 20 project out of the apertures 18 into the interior of the hollow cylinder 16. In this configuration, the balls 18 grip tightly to the shaft (not shown) which passes through the inner cylinder. In a weight collar application, for example, the shaft would be a weight bar on which weights are held. The locking mechanism would be slid onto the weight bar in the unlocked configuration, and would be placed against the weights, and then would hold the weights firmly on the bar when the locking mechanism is urged to the locked configuration of FIG. 1.

One of the important features of the locking mechanism described here is that it is specifically designed such that it can be slid onto a bar in either direction (e.g., side one 10 being advanced on the bar first, or side two 12 being advanced on the bar first), and will still hold weights (or whatever the locking mechanism is connected) securely and firmly. This is accomplished by the inclines 22 and 24, located at the inner surfaces of side one 10 and side two 12 of the locking mechanism, urging the balls 18 to project out of the apertures 18. In the locked position of the locking mechanism, the inclines 22 and 24 are aligned with the two spaced apart rows of apertures 18 in the inner hollow cylinder 16, and the balls are urged up the inclines 22 and 24 to project out of the apertures 20. If weights are positioned on side two 12 of the locking mechanism and the weight bar is tilted downward to the right, this ball or balls 20 on incline 24 will tend to grip the bar even more tightly because the angle of incline 24 would be acting against the tilting motion of the bar. The same is true if the weights were positioned on side one 10 of the bar. Here, if the bar is tilted downward to the left, the incline 22 would oppose the tilting movement and would urger the ball or balls 20 on the incline 22 tightly against the bar. Thus, having two inclines 22 and 24 angled in opposite directions, provides the locking mechanism with exceptional performance regardless of which direction the locking mechanism is installed on a shaft and regardless of which directions forces are applied which might oppose the frictional gripping afforded by the locking mechanism.

The inclines 22 and 24 may be integral with the inner surfaces of side two 12 and side one 10 of the locking mechanism, respectively. However, in some applications, the inclines need not be integral. For example, in some applications, a radial incline plane 22' and 24' may be attached to the surface of the inclines 22 and 24, respectively, and the radial incline may be a metal or toughened plastic. However, the radial incline plan 22' and 24' may simply be a toughened surface of the inclines 22 and 24 formed by a electromagnetic or chemical treatment. But if the material used for side 1 and side 2 is a tough hard material, no surface liner or treatment like 22' and 24' need be present. Moreover, while FIG. 1 shows the radial incline plane 22' and 24' resting directly on the inclines 22 and 24, in some applications the surfaces 22 and 24 need not be inclined, and only the radial inclined planes 22' and 24' will be inclined and will be attached to the surfaces 22 and 24 by a suitable mechanical configuration. In these configurations, the radial inclined planes may be metal, plastic, ceramic, or combinations thereof (e.g., metal on plastic).

With reference back to FIG. 1, the balls 20 need not be present in every aperture 18 of the two rows of apertures. Reasonable performance could be obtained with at least one ball 20 in one aperture 18 of each row. However, better performance results when a ball 20 is present in every other aperture for each of the two rows of apertures, and where the apertures extend throughout the circumference of the inner hollow cylinder 16 such that balls 20 will be pressing against the shaft from multiple, radially spaced locations.

In operation, when side one 10 and side two 12 of the locking mechanism are separated slightly by movement in the axial direction of the inner hollow cylinder 16 as is indicated by double headed arrow 26, the balls 20 will retract partially or fully from the apertures 18 and be permitted to roll downward along inclines 22 or 24. When this occurs, the inner hollow cylinder 16 is permitted to move freely along the shaft on which it is attached (or, for example, in the case of a stretching pole or umbrella, the shaft will be able to slide freely through the hollow cylinder 16. However, the locking mechanism is designed to be biased to its locked position as is shown in FIG. 1, by biasing members 28, which function as tension retainers. In a preferred embodiment, the biasing members 28 are springs, such as wavy springs, that pull side one 10 and side two 12 of the locking mechanism firmly together. An advantage of the wave spring configuration is that it can completely encircle the inner hollow cylinder 16. Because of the bias, the inclines 22 and 24 move back together, as is shown in FIG. 1, and the balls 20 ride back up the inclines and protrude out of apertures 18 into the center of the hollow cylinder 16 and engage the shaft for a locking attachment.

A variety of designs can be used to hold each of the pieces of the locking mechanism together. In FIG. 1 the hollow cylinder 16 is configured with an outwardly protruding flange 32 at one end which holds a biasing member 28 between the hollow cylinder 16 and side one 10, as well as between the outwardly protruding flange 32 and incline 24. At the other end of the hollow cylinder 16, a plate 34 (or a series of plates) connects with the outer circumference of hollow cylinder 16, and hold another biasing member 28 between the hollow cylinder 16 and side one 12 of the locking mechanism, as well as between the plate 34 and incline 22.

Figure 2:
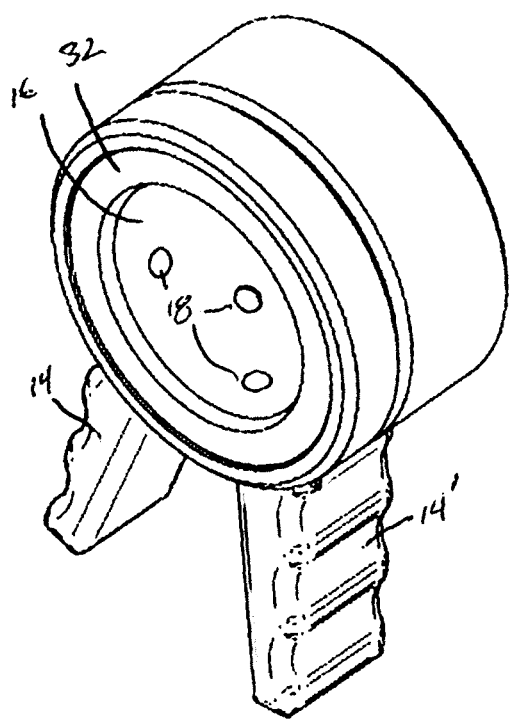
FIG. 2 is an isometric view of a locking mechanism according to the invention.
Figure 3:
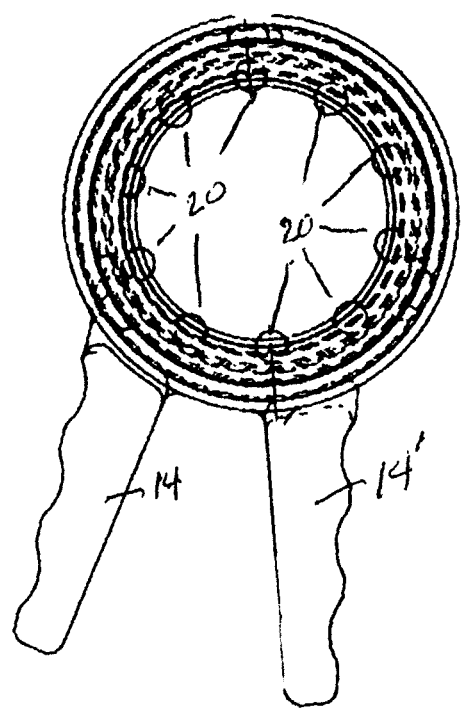
FIG. 3 is a cut away plan view of the locking mechanism according to the invention.

FIG. 2 shows an isometric view of the locking mechanism, and FIG. 3 shows a cut-away plan view of the locking mechanism. It can be seen that the handles 14 and 14' are designed to be clamped together to slightly separate side one 10 from side two 12, as discussed above in conjunction with FIG. 1 and double headed arrow 26, to cause balls (not shown in FIG. 2, but shown as 20 in FIG. 3) to retract from apertures 18. In the locked position, as shown in FIG. 3, the balls 20 protrude into the inner hollow cylinder 16, and firmly grip the shaft (bar, pole, etc.) to which the locking mechanism is affixed.

Figure 4:
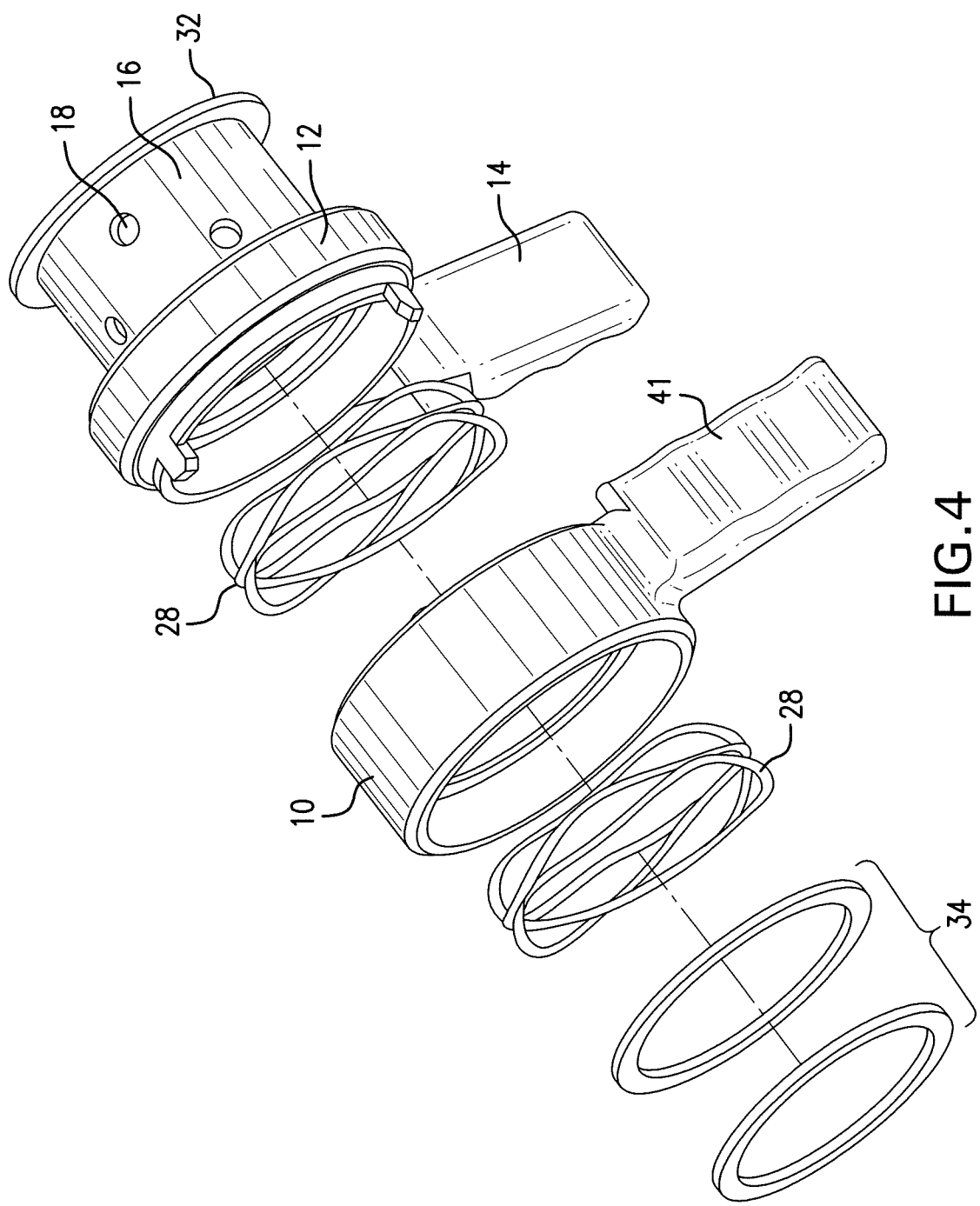
FIG. 4 is an exploded view of a number of components used in the locking mechanism of FIG. 1.

FIGS. 4 and 5 show exploded views of some of the various components used in the locking mechanisms discussed above including the balls 20, side 110 and side two 12 of the locking mechanism, the wavy spring biasing members 28 and 30, and the series of plates 34. One of the differences illustrated in FIGS. 4 and 5 is that the inner hollow cylinder 16 of FIG. 4 has the two rows of apertures 18 formed in a way where the apertures are staggered. In contrast, FIG. 5 has an inner hollow cylinder where the apertures 18 in the two rows are aligned. The positioning of the apertures 18 can be varied, as is illustrated in Figured 4 and 5; however, when the locking mechanism is assembled, the axially spaced apart rows of apertures must be aligned with inclines 22 and 24 as is shown in FIG. 1.

The ability to separate side one 10 from side two 12 of the locking mechanism slightly, such as for unlocking the locking mechanism as described above in conjunction with FIG. 1, can be accomplished by a variety of techniques. One technique is similar to that described in U.S. Pat. No. 9,925,407, and is illustrated by example in FIG. 5. Side one 10 of the locking mechanism may be outfitted with a series of inclined slots 36 around its circumference, and side two 12 of the locking mechanism may include a plurality of projections 38 which interact with the slots 36. In the locked position, the projections 38 will rest at the bottom of the slots 36, and the locking mechanism will assume the configuration as shown in FIG. 1. However, when the handles 14 and 14' are clamped together the projections 38 will ride up the slots 36, and this will cause side one 10 and side two 12 of the locking mechanism to move axially away from one another, as is shown by double headed arrow 26 in FIG. 1. As described above, this clamping action causes the balls 20 to slide down the slightly separated inclines 22 and 24, thereby permitting the inner hollow cylinder 16 to freely slide on or be removed from a shaft (not shown). When the clamping action of the handles is released, the projections 38 slide back down the slots 36 under the influence of the biasing members 28 and 30, and this causes the balls 20 to ride back up the inclines 22 and 24 and project outwardly through the apertures 18 into the interior volume of the hollow cylinder 16 and exert a clamping force against the shaft.

The invention claimed is:

1. A lock, comprising:
an inner hollow cylinder with at least two apertures, wherein said at least two apertures extend from an inside of the inner hollow cylinder to an outside of the inner hollow cylinder;
a first side member and a second side member which are moveable axially away from each other relative to an axial direction of the inner hollow cylinder, wherein each of the first side member and the second side member include portions on an outer periphery of the inner hollow cylinder;
first and second biasing members which bias the first side member and the second side member axially towards each other relative to the axial direction of the inner hollow cylinder, wherein the first biasing member is positioned between at least portions of the first side member and the inner hollow cylinder and the second biasing member is positioned between at least portions of the second side member and the inner hollow cylinder;
first and second inclines respectively positioned at inner surfaces of the first and second side members and are axially moveable with the first and second side members, wherein the first and second inclines each face towards the inner hollow cylinder, wherein the first incline is positioned in alignment with at least a first aperture of the at least two apertures of the inner hollow cylinder and the second incline is positioned in alignment with at least a second aperture of the at least two apertures in the inner hollow cylinder; and
at least a first ball sized to project partially through the at least a first aperture and at least a second ball sized to project partially through the at least a second aperture, wherein when the first side member and the second side member are moved axially away from each other the at least a first ball and the at least a second ball are retracted from projecting out through the at least a first aperture and the at least a second aperture, respectively, by movement along the first and second inclines, and when the first side member and the second side member are moved axially toward each other by the first and second biasing members the at least a first ball and the at least a second ball are moved by the first and second inclines to project outward through the at least a first aperture and the at least a second aperture, respectively.

2. The lock of claim 1 wherein the first and second inclines are integrally formed as part of the inner surfaces of the first and second side members, respectively.

3. The lock of claim 1 wherein the first and second inclines are radial inclined planes that are affixed to the inner surfaces of the first and second side members, respectively.

4. The lock of claim 1 wherein one or more of the at least a first ball and the at least a second ball are brass.

5. The lock of claim 1 wherein one or more of the at least a first ball and the at least a second ball are plastic.

6. The lock of claim 1 wherein the at least a first aperture includes at least two apertures aligned in a first row and the at least a second aperture includes at least two apertures aligned in a second row.

7. The lock of claim 1 and wherein the first incline is angled in a direction opposite an angular direction of the second incline.

8. The lock of claim 1 further comprising first and second handles respectively connected to the first and second side members.

9. The lock of claim 8 wherein the first and second handles are integrally formed with the first and second side members respectively.

10. The lock of claim 1 further comprising inclined slots circumferentially positioned on the first side member, and projections which slide within said inclined slots positioned on the second side member, wherein sliding movement of the projections up the inclined slots causes the first and second side members to move axially away from one another.

11. The lock of claim 1 wherein said first and second biasing members are springs.

12. The lock of claim 11 wherein the springs are circular wavy springs which extend around a circumference of the inner hollow cylinder.

* * * * *